United States Patent [19]

Baughn

[11] 4,277,332

[45] Jul. 7, 1981

[54] WATER PURIFIER

[75] Inventor: John W. Baughn, Saline, Mich.

[73] Assignee: Gelman Sciences, Inc., Ann Arbor, Mich.

[21] Appl. No.: 128,596

[22] Filed: Mar. 10, 1980

[51] Int. Cl.³ .................... B01D 15/04; B01D 23/14; B01D 31/00

[52] U.S. Cl. ................................ 210/96.2; 210/136; 210/266

[58] Field of Search .................... 210/96.1, 96.2, 136, 210/257.1, 257.2, 260, 266, 282, 283, 284, 287, 290, 317, 318, 321 R, 416 R, 416 DW, 493 M, 494 M, 497 R

[56] References Cited

U.S. PATENT DOCUMENTS

| | | | |
|---|---|---|---|
| 3,084,427 | 4/1963 | Holcomb | 210/497 R |
| 3,618,775 | 11/1971 | Hultgren | 210/136 |
| 3,964,999 | 6/1976 | Chisdes | 210/96.2 |
| 4,160,727 | 7/1979 | Harris | 210/257.2 |
| 4,196,081 | 4/1980 | Pavia | 210/283 |

Primary Examiner—Ivars C. Cintins
Attorney, Agent, or Firm—Reising, Ethington, Barnard, Perry & Brooks

[57] ABSTRACT

A water purifier having its principal utility in medical, biological and chemical laboratories comprising a housing having a water inlet and three water outlets and containing a charcoal layer which strips the water of absorbed and non-ionized dissolved impurities, and an ion-exchange resin layer which strips the water of ionized dissolved impurities, and a submicron pore size filter membrane which strips the water of bacteria and other solid impurities, two of the three water outlets being for withdrawing water from the housing after it has passed through the aforesaid layers and the membrane, and the third of the three water outlets being for withdrawing water from the housing after it has passed through the aforesaid layers not through the membrane. The purifier further includes a water reservoir and a pump for pumping water from the reservoir through the inlet opening into the housing, the water from the third outlet opening and from one of the other two outlet openings being cycled back to the reservoir for recycling through the housing until the ionized impurity content of the water has been reduced to the extent desired, there being means for measuring such impurity in the water cycled back to the reservoir. The other of the two outlets for the water which has passed through the layers and the membrane is connected to a conduit which leads to a dispensing outlet for the purified water, valve means being provided for opening this conduit and for closing the conduit which leads the filtered water back to the reservoir when the impurity content has been reduced to the level desired.

10 Claims, 7 Drawing Figures

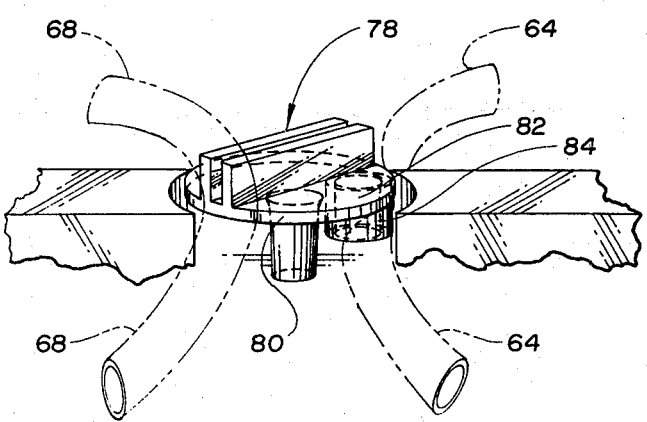
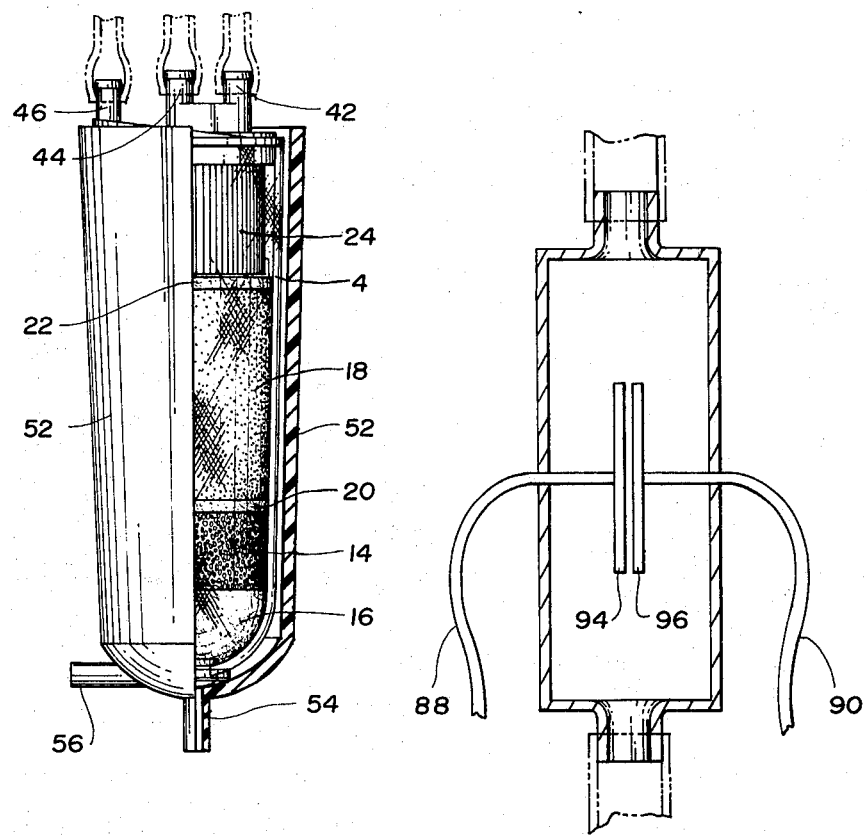

WATER PURIFIER

TECHNICAL FIELD

The subject matter of the present invention is a water purification device having particular utility in medical, biological and chemical laboratories where there is requirement for water which is not only chemically pure but also biologically pure, i.e. free of bacteria.

BACKGROUND ART

The need for chemically and biologically pure water in the aforementioned kinds of laboratories is presently most commonly met by the use of bottled distilled water. This has a number of disadvantages. First, even freshly distilled water is not of ultra high purity unless it is repeatedly distilled in distillation equipment which assures against contamination during distillation. Secondly, even where the freshly distilled water is of ultra high purity, contamination from its container or otherwise can occur, and in the absence of stringent precautions does occur, particularly during extensive periods of storage. Added to this is the fact that the purity requirements for the water can vary, even within one laboratory, depending upon the nature of the experimental or other work being conducted, ordinary single-distilled water being satisfactory in some instances and ultra high purity water being required in others.

It is well known that water can be stripped of its ionized impurities by flowing it through a column of ion-exchange resin and that water can be stripped of absorbed impurities and of various non-ionized dissolved impurities by flowing it through a column of activated charcoal. Also, it is known that water can be stripped of bacteria by passing it through a sub-micron pore size membrane. Hence, it would be possible for a laboratory worker to purify water by passing it through these three media. However, this would, like the use of bottled distilled water, involve considerable trouble and expense and would, absent additional trouble and expense, provide no control over the extent to which the water would be purified to the end that in some instances the water would be more pure, and in other instances less pure, than required for the particular work being conducted. Still further, absent other precautions, the water so prepared could be less pure biologically than prior to such treatment particularly in that the arrangement of the media and other components of the system could, and likely would, be such as to present hazard of greater rather than lesser bacterial contamination of the treated water.

Hence, there is need for a convenient, relatively inexpensive and reliable water purification device which enables a worker to controllably treat water to the degree of purity and in the quantities as needed. The present invention fulfills this need.

DISCLOSURE OF INVENTION

In the water purification device of the present invention, the water to be purified is conducted through an entrance opening in the bottom of an elongated vertically arranged cylindrical housing which contains as the treating media a layer of charcoal, a layer of ion-exchange resin and a sub-micron pore size filter membrane, the latter being at the top of the housing and being in the form of a cylinder of lesser diameter than that of the housing which is spaced from the housing and which is sealed at the bottom by a plate and sealed at the top to the upper wall of the housing. The upper wall is tilted at an angle to the longitudinal axis of the housing such that it has a high side and a low side, and has three water outlet openings therethrough, a pair of these openings being located centrally in the upper wall for exit of water which has passed through the membrane and the other of the outlet openings being adjacent the periphery of the upper wall on the high side thereof for exit of water which has passed through the charcoal and ion-exchange resin layers but has not passed through the membrane. By having the upper wall tilted and by provision of the latter opening, any air entering the housing can escape through this latter opening without being required to pass through the membrane which because of its extremely small pore size is, when wet, less pervious to air than to water. A conduit connects the latter opening to a water reservoir and a pair of conduits are connected to the pair of openings for exit of the water which has passed through the membrane, one of this pair of conduits extending to the reservoir and the other extending to a water-dispensing outlet, there being a valve for selectively closing one while opening the other of the pair of conduits whereby the water which has passed through the membrane is either routed to the reservoir or to the water-dispensing outlet. Another conduit extends from the reservoir to the inlet opening of the housing containing the water purification media and a pump is provided for circulating the water from the reservoir to the housing, water in the housing which has not passed through the membrane being continuously circulated back to the reservoir while the pump is in operation and water which has passed through the membrane being either circulated back to the reservoir or to the water-dispensing outlet depending upon the position of the valve. A conductivity cell is provided for measuring the electrical resistivity of water exited from the housing, there being an electrical circuit, including a water temperature sensor, for converting the electrical resistivity reading to measurement of the purity of the water. Further in accordance with the invention, the conductivity cell for measuring the electrical resistivity of the water is preferably located in the conduit which carries back to the reservoir the water which has not passed through the membrane, such location of the conductivity cell assuring that any bacterial contamination or growth in the conductivity cell will not be able to reach the interior of the cylindrical membrane or the opening or conduit which carries fully purified water to the dispensing outlet. Further in accordance with the preferred embodiment, the housing with the purification media therein, as described, takes the form of a replaceable and disposable cartridge which fits, in sealed relationship, into a receptacle for use until contaminated or depleted of its purifying capacity, evident, when it happens, from the water purity readings provided by the device, whereupon the cartridge can be easily removed and replaced with a fresh one. The entire device can be constructed to compact size such that it can be supported on and occupy only about a square foot of a laboratory table. In operation, all the laboratory worker need do to obtain water of the high purity desired is to switch on the pump, with the valve being turned to its water-recirculating position, and then, when the water purity reading reaches that desired, turn the valve to its water-dispensing position and draw the quantity of water desired from the water-dispensing outlet and then switch off the pump.

Other features and advantages of the device will be apparent from the following more detailed description thereof, made with reference to the appended drawings.

BRIEF DESCRIPTION OF DRAWINGS

FIG. 1 is a perspective view, partially schematic and partially exploded, showing the components of the device in their connected and cooperative relationship;

FIG. 5 is an enlarged view of the valve and its associated conduits shown in FIG. 1;

FIG. 6 is a side view in section showing the cartridge with the water purification media therein, seated and sealed in the receptacle therefor; and FIG. 7 is a side view in section, and in enlarged scale, of the conductivity cell which is a component of the device shown in FIG. 1.

BEST MODE FOR CARRYING OUT THE INVENTION

Figure 1:
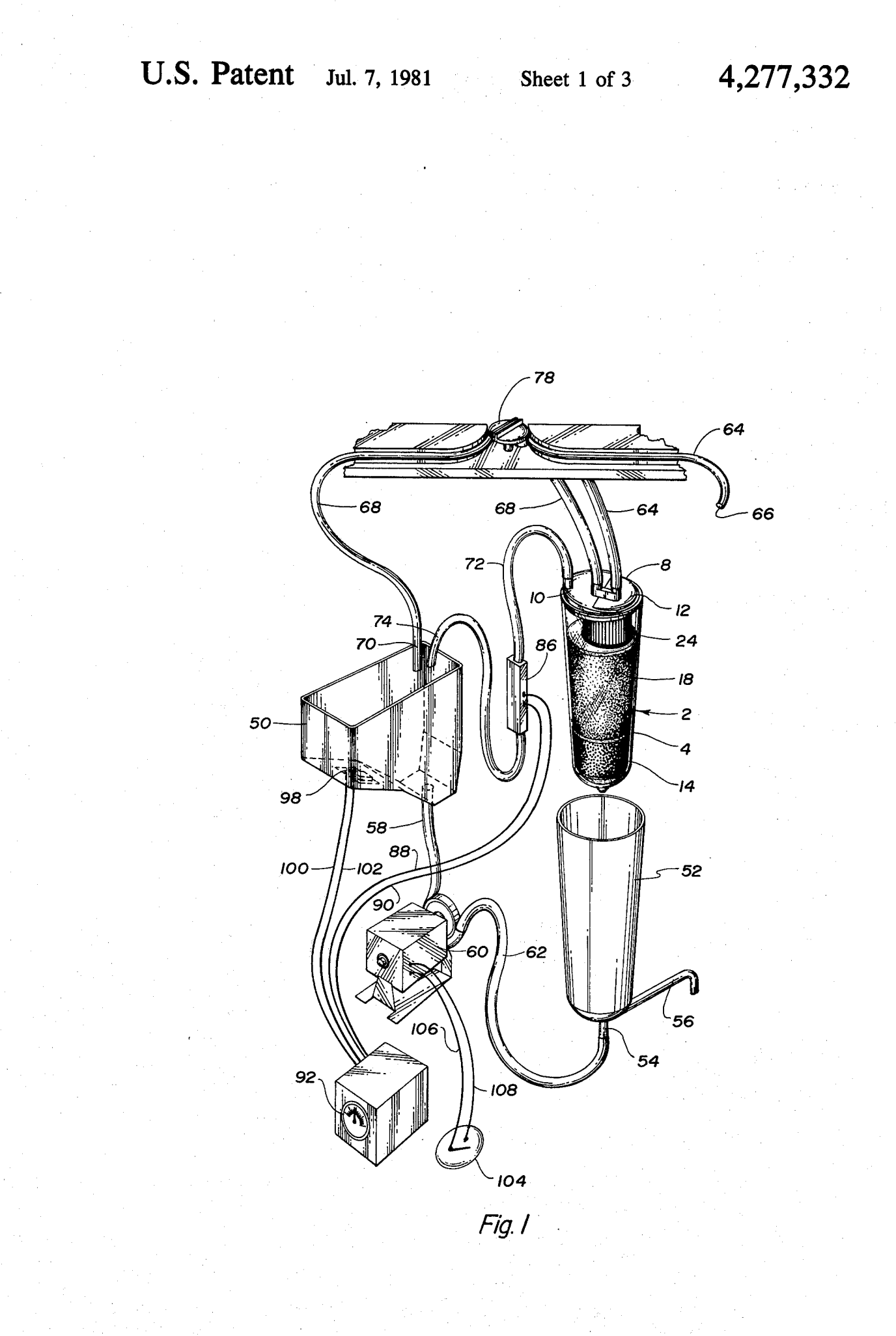
Figure 2:
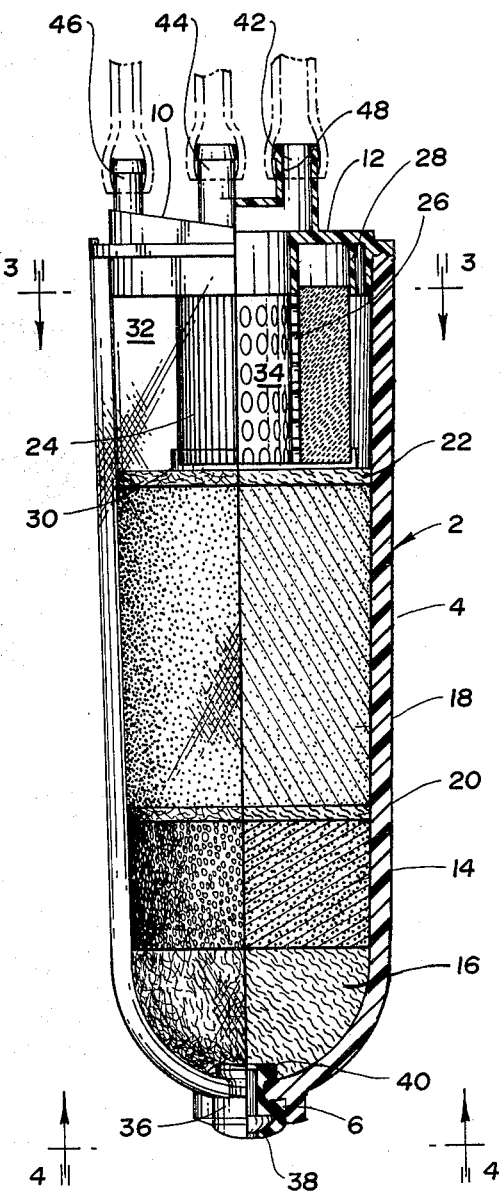
FIG. 2 is a side view in section, and in enlarged scale, of the water purification cartridge with the water purification media therein.
Figure 3:
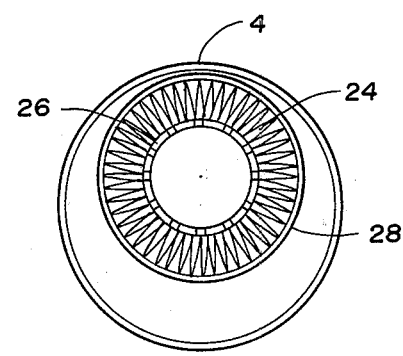
FIG. 3 is a view taken on the line 3—3 of FIG. 2.

Referring to FIGS. 1, 2, 3 and 4, the device shown comprises a water purification cartridge 2 having an elongated cylindrical housing 4 with a water inlet opening 6 in the bottom tapered wall thereof and having an upper wall 8 one side 10 of which is tilted upwardly, from center to edge, at an angle of approximately 5° to the longitudinal axis of the housing whereby the upper wall has a high portion 10 to one side and a low portion to the other side of the longitudinal axis. Within the housing is a water permeable layer 14 of particulate activated charcoal which is supported and spaced from the water inlet opening by a water permeable layer 16 of fibrous material. Above the charcoal layer is a water-permeable layer 18 of particulate ion-exchange resin supported and spaced from the charcoal layer by a water-permeable layer 20 of fibrous material. Another layer 22 of water-permeable fibrous material covers the top of the ion-exchange resin layer. In the upper end of the housing is a filter membrane 24 having a maximum pore size of less than about 0.5 microns, and preferably about 0.2 microns average pore size, which membrane is in the form of a pleated cylinder with the pleats extending axially, in the direction of the longitudinal axis of the housing as shown. A perforated tube 26 is positioned in the interior of and in contact with the cylindrical membrane to provide support therefor. The top of the cylindrical membrane is bonded in sealed relationship to a downwardly extending annular flange 28 on the upper wall 10 of the housing and the bottom of the cylindrical membrane is bonded in sealed relationship to a water-impermeable plate 30 which abuts the layer 22 of fibrous material. The cylindrical membrane 24 and the plate 30 are of lesser diameter than and, in the preferred embodiment shown, are eccentric with the housing thereby providing a generally annular space 32 exterior of the cylindrical membrane, between the membrane and the housing, which space is greater on the side of the housing with the high upper wall portion 10. Hence, the space 34 to the interior of the cylindrical membrane is separated from the space 32 and from the remainder of the interior of the housing by the water-permeable membrane and the water-impermeable plate, to the end that water within the housing can reach the space 34 to the interior of the cylindrical membrane only by passing through the membrane. The reason for the preferred eccentric relationship between the cylindrical membrane and the housing will be more apparent after description of the arrangement of the outlet openings set forth hereinafter.

The housing, including the upper wall thereof are preferably made of a transparent organic plastic, the upper wall being provided in the form of a cap to which the subassembly of the pleated cylindrical membrane 24 and the plate 30 can be sealingly bonded and with the cap then being sealingly bonded about its periphery to the top of the cylindrical side wall of the housing after all the aforesaid layers have been inserted therein. The cylindrical membrane can be sealingly bonded to the plate 30 and to the flange 28 on the upper wall by a suitable potting compound.

The composition of the fibrous material used for the fibrous layers should preferably be such as to give minimum contamination to the water. Fibrous polyester polymer such as Dacron is excellent. The fibrous layers should be packed only to such extent as to provide good support for the other layers without causing undue restriction to the flow of water therethrough.

Activated charcoal of a particle size of about 10 to 100 mesh is quite satisfactory for the charcoal layer.

The ion-exchange resin layer should, of course, include both a cation-exchange resin and an anion-exchange resin and can be selected from any of those which are commercially available for substantially completely stripping water of both anions and cations so as to provide water having substantially no ionized impurities. Exemplary of such ion-exchange resins which are quite satisfactory for use in the device is that marketed by Ionac Chemical Company of Birmingham, N.J. under the trademark IONAC NM-60 wherein a hydrogen form sulfonated polystyrene copolymer functions to strip the cations and replace same with hydrogen ions, and a hydroxyl form alkyl quaternary ammonium polystyrene copolymer functions to strip the anions and replace same with hydroxyl ions. Such ion-exchange resins are furnished commercially in the form of small beads of from about $-16$ to $+50$ mesh (U.S. standard mesh), entirely satisfactory for use in the practice of the present invention. Another example of an ion-exchange resin which is quite satisfactory is that marketed under the designation IRN-150 L/C by Rohm and Haas Corporation of Philadelphia, Pa.

The filter membrane 24 can be of a polymeric material, such as cellulose acetate, manufactured to the desired sub-micron pore size and currently available in the market. The membrane presently being made and sold by the assignee of the present invention under the trademark Acropore and have a pore size of less than 0.5 microns is excellent for the practice of the invention. The important point with respect to the membrane is that it have a pore size sufficiently small to constitute a bacteria barrier and it is in consideration of this fact that the maximum pore size be less than 0.5 microns, and preferably about 0.2 microns average pore size whereby there is optimum assurance that the passage of bacteria, and like sized other solids, will be blocked without undue resistance to the flow of water.

Figure 4:
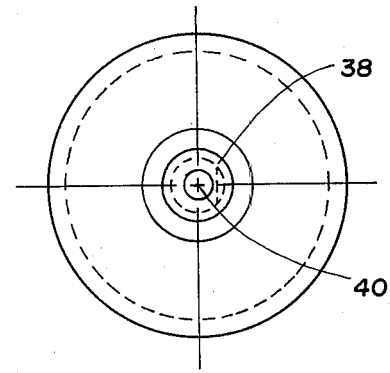
FIG. 4 is a view taken on the line 4—4 of FIG. 2.

As can best be seen in FIGS. 2 and 4 the tapered bottom wall of the housing is constructed with a round opening at the bottom thereof and inserted into this opening in sealed relationship therewith is a round elastomeric body 36 having a bottom annular surface 38 and having a central wall portion with a one-way flapper valve 40 which functions to prevent the flow of water out of the housing but which allows the flow of water upwardly therethrough, into the housing, when the pressure of the water below the flapper valve exceeds a predetermined pressure.

The upper wall of the housing has three openings therethrough, a pair of which openings 42 and 44 are of equal size, i.e. diameter, and are located centrally of the upper wall and communicate with the space 34 interior of the cylindrical membrane and the third of which, opening 46, is of smaller size and extends through the high portion 10 of the upper wall and communicates with the space 32 between the housing and the membrane. The upper wall is formed with an upwardly extending annular projection around each of the openings, one of which is shown at 48, these projections being for securing flexible conduits to the openings. The eccentricity between membrane 24 and the housing provides increased spacing on the high side of the housing for locating opening 46 therethrough.

The device includes water reservoir 50 which is open at the top for addition and replenishing of the supply of water to be purified.

The device also includes a receptacle 52 having the same shape as the housing 4 of the cartridge for snug reception of the cartridge therein, as shown in FIG. 6. The receptacle has an opening 54 at the bottom thereof which communicates with the flapper-valved opening in the bottom of the cartridge housing, the bottom annular surface 38 of the elastomeric body 36 being pressed into engagement with the inner surface of the receptacle surrounding the opening 54 thereby to provide a seal. The receptacle is provided with a drain opening 56 for the drainage of any water that might, by spillage or otherwise, get into the receptacle prior to insertion of the cartridge.

A conduit 58 is connected to an opening in the bottom of the reservoir and is connected, at its other end, to the inlet of a pump 60, a conduit 62 extending from the outlet of the pump 60 to the opening at the bottom of the receptacle whereby it communicates with flapper-valved opening in the bottom of the cartridge housing. The pump, which can be of the gear type, pumps the water into the opening 54 with sufficient pressure to cause it to flow through the flapper valve into and through the cartridge.

Connected to opening 42 is a conduit 64 which leads to a water-dispensing outlet 66. Conduit 68 is connected to opening 44 and empties at its other end 70 into the reservoir. Connected to the opening 46 is a conduit 72 the other end 74 of which also empties into the reservoir, this conduit 72 including a conductivity cell 76 to be described hereinafter.

As best shown in FIG. 5, a two-position valve 78 is operatively associated with conduits 64 and 68 such that when the valve is in one position it closes conduit 64 and simultaneously allows conduit 68 to open, and when in the other position closes conduit 68 and simultaneously allows conduit 64 to open. In the preferred embodiment shown, the valve is a roller valve comprising a pivotable knob 80 having a pin 82 adjacent its periphery carrying a rotatable roller 84 which roller, depending upon the rotative position of the knob, engages and pinches closed conduit 64 or engages and pinches closed conduit 68, the inherent resiliency of the conduits causing them to be open when not pinched closed by the roller. In FIG. 5 the valve is shown in its position closing conduit 64, with conduit 68 being open.

The conduit 72 extending from the small opening 46 to the reservoir 50 includes a conductivity cell 86 through which the water flows, this conductivity cell being connected into an electrical circuit, by electrical leads 88 and 90, which shows, on meter 92, the electrical resistivity, and hence the purity of the water. As shown in FIG. 7, the conductivity cell is of conventional structure comprising a pair of spaced metal plates 94 and 96, with leads 88 and 90 connected thereto, for applying an electrical voltage across the plates to the water flowing between the plates thereby to measure the electrical resistivity of the water. Because the electrical resistivity of water is a function not only of its ionized impurity content but also its temperature, the circuit includes a suitable water temperature sensor 98 located in the reservoir and connected into the circuit by electrical leads 100 and 102.

A suitable manually operated switch 104 connected to the pump 60 by leads depicted at 106 and 108 is for actuating the pump. When the pump is actuated it pumps water from the reservoir 50 through the flapper valve into and through the cartridge, through the small opening 46 and conduit 72 back to the reservoir 50 and, depending upon the position of the valve 78, either through the opening 44 in conduit 68 back to the reservoir or through the opening 42 and the conduit 64 to the water-dispensing outlet 66. Hence, while the pump is activated and after the cartridge is filled with water, water continuously flows through the opening 46 and conduit 72 back to the reservoir, bypassing the filter membrane 24, irrespective of whether the additional water which exits from the top of the cartridge, and which has flowed through the filter membrane, flows through conduit 68 and back to the reservoir or through the conduit 64 to the water-dispensing outlet. Because the opening 46 is smaller than each of the openings 42 and 44, most of the water flowing from the cartridge flows through whichever of conduits 64 and 68 is open, depending on the position of valve 78.

In operation, when a laboratory worker desires to obtain purified water from the device he or she turns valve 78 to the position closing conduit 64 and actuates the pump by means of the switch 104 which can be wired to also actuate the water purity meter circuit. The worker then monitors the meter 92 until the reading shows the degree of water purity desired whereupon the worker rotates the valve 78 to close conduit 68 and open conduit 64. When the amount of pure water desired has been drawn from water outlet 66, the worker switches off the pump and meter circuit.

At the outset of operation, any air in the cartridge exits through opening 46 and hence is not required to pass through the filter membrane which, when wet, is more resistant to the flow of air than the flow of water. If the air were required to exit from the cartridge by passage through the membrane, there would be requirement for flowing the water into the cartridge at substantially increased pressure solely for the purpose of driving the air through the membrane. Elimination of air from the cartridge is further facilitated by constructing the upper wall of the cartridge with the upwardly tilted portion 10 thereby minimizing the possibility of entrapping air at the upper end of the cartridge.

The possibility of any bacterial contamination of water exiting through the water outlet 66 is minimized by locating the conductivity cell in the conduit which extends through the reservoir from opening 46. That is, even if the device is idle for a long period sufficient to enable bacterial growth, any bacteria resulting from such growth will always be in water on the upstream side of the membrane 24 to the end that such bacteria will be filtered out by passage of the water through the membrane when the device is actuated. It is preferred that the conductivity cell be located as closely as possible upstream of the ion-exchange resin, such location being feasible by locating it in the filter membrane by-pass conduit 72. Even though the conductivity cell measures only the ionized impurity content, this is a sufficient measurement of the total impurity content since, as a practical matter, by the time the ionized impurity content of the cycled water is reduced to the desired level, the other impurities, removed by the charcoal and by the membrane, are substantially eliminated or are least reduced to an equally low level. This is because it is more difficult, i.e. requires more residence time, to remove the ionized impurity than to remove unionized impurity, and in this regard it should be noted that in the preferred embodiment shown the thickness of the ion-exchange layer is more than twice that of the charcoal layer. By the provision of being able to circulate the water through both of these layers, and also through the membrane a number of times before drawing water from the purified water outlet, a relatively small cartridge having a height of only about 8", or even less, and a diameter of less than 3", is feasible for providing water of ultra high purity, the arrangement of the membrane in its pleated cylindrical configuration providing ample membrane surface area assuring high biological purity, good flow rate and an extended period of cartridge life, even though the cartridge is of compact size.

It will be understood that while the invention has been described chiefly with reference to a preferred embodiment thereof, various changes and modifications may be made all within the full and intended scope of the claims which follow.

What is claimed is:

1. A water purification device comprising an elongated cylindrical housing having an entrance opening at the bottom end thereof for entrance into said housing of the water to be purified and having an upper wall at the top end thereof; a water-permeable layer of particulate charcoal in said housing; a water-permeable layer of particulate ion-exchange resin in said housing above said layer of particulate charcoal; a cylindrical water-permeable filter membrane having a pore size of less than 0.5 microns secured and sealed at its upper end to said upper wall of said housing and sealed at its lower end by a round impermeable plate, said cylindrical filter membrane and round plate having a diameter less than that of said housing thereby providing a space exterior of said cylindrical membrane, between said housing and said cylindrical membrane, separated by said membrane from the space interior of said cylindrical membrane whereby water in said housing exterior of said cylindrical membrane can reach the space interior of said membrane only by passage through said membrane; said upper wall of said housing having a pair of openings therethrough adjacent the center thereof communicating with the space interior of said cylindrical membrane for exit from said housing of water which has passed through both of said layers and through said membrane, and said upper wall having a third opening therethrough adjacent the periphery thereof which communicates with said space between said membrane and said housing for exit from said housing of water which has passed through both of said layers but not through said membrane.

2. A water purification device as set forth in claim 1, wherein the thickness of the ion-exchange resin layer is more than twice that of the charcoal layer and wherein the cylindrical membrane has axially extending pleats.

3. A water purification device as set forth in claim 1 wherein the cylindrical membrane is positioned eccentrically in said housing and toward the side of the housing opposite the location of said third opening in said upper wall.

4. A water purification device as set forth in claim 1 wherein said entrance opening has a one-way valve therein allowing entrance of water into said housing therethrough but preventing exit of water from said housing therethrough.

5. A water purification device comprising an elongated cylindrical housing having an entrance opening at the bottom end thereof for entrance into said housing of the water to be purified and having an upper wall at the top end thereof which is at an angle to the longitudinal axis of said housing whereby said wall has a high portion on one side of the longitudinal axis and a low portion on the other side of the longitudinal axis of said housing; a water-permeable layer of particulate charcoal in said housing supported and spaced from said entrance opening by a water-permeable layer of fibrous material; a water-permeable layer of particulate ion-exchange resin in said housing above said layer of particulate charcoal and supported and spaced from said layer of particulate charcoal by a layer of fibrous material; a water-permeable cylindrical filter membrane having a pore size of less than 0.5 microns secured and sealed at its upper end to said upper wall of said housing and sealed at its lower end by a round impermeable plate, said cylindrical filter membrane and round plate being of less diameter than and spaced from said housing thereby providing a space exterior of said cylindrical membrane between said housing and said cylindrical membrane and a space interior of said cylindrical membrane separated from said first-mentioned space by said membrane whereby water in said housing exterior of said cylindrical membrane can reach the space interior of said membrane only by passage through said membrane; and a water-permeable layer of fibrous material between said plate and said layer of ion-exchange resin; said upper wall of said housing having a pair of openings therethrough adjacent the center thereof communicating with the space interior of said cylindrical membrane for exit from said housing of water which has passed through all of said layers and through said membrane, and said upper wall having a third opening which extends through the high portion thereof and communicates with said space between said membrane and said housing for exit from said housing of water which has passed through all of said layers but not through said membrane.

6. A water purification device comprising:
an elongated cylindrical housing having an entrance opening at the bottom end thereof for entrance into said housing of the water to be purified and having an upper wall at the top end thereof; a water-permeable layer of particulate charcoal in said housing; a water-permeable layer of particulate ion-exchange resin in said housing above said layer of particulate charcoal; a cylindrical water-permeable filter membrane having a pore size of less than 0.5 microns secured and sealed at its upper end to said upper wall of said housing and sealed at its lower end by a round impermeable plate, said cylindrical filter membrane and round plate having a diameter less than that of said housing thereby providing a space exterior of said cylindrical membrane, between said housing and said cylindrical membrane, separated by said membrane from the space interior of said cylindrical membrane whereby water in said housing exterior of said cylindrical membrane can reach the space interior of said membrane only by passage through said membrane; said upper wall of said housing having a pair of openings therethrough adjacent the center thereof communicating with the space interior of said cylindrical membrane for exit from said housing of water which has passed through both of said layers and through said membrane, and said upper wall having a third opening therethrough adjacent the periphery thereof which communicates with said space between said membrane and said housing for exit from said housing of water which has passed through both of said layers but not through said membrane, said third opening being smaller than either of said pair of openings;

a water reservoir;

a first conduit extending from one of said pair of openings to said reservoir;

a second conduit extending from the other of said pair of openings to a water outlet;

a third conduit extending from said third opening to said reservoir;

conduit means extending from said reservoir to the entrance opening on the bottom end of said housing;

a pump for pumping water from said reservoir into and through said housing;

valve means operatively associated with said first and second conduits for closing one of said first and second conduits and opening the other of said first and second conduits; and an electrical conductivity cell in one of said conduits extending from said housing to said reservoir to measure the electrical resistivity of the water flowing therethrough.

7. A water purification device as set forth in claim 6 wherein said entrance opening in said housing is a one-way valve therein allowing the flow of water therethrough into said housing when the pressure of the water exceeds a predetermined pressure.

8. A water purification device as set forth in claim 6 wherein said electrical conductivity cell is in the conduit extending from said third opening to said reservoir.

9. A water purification device as set forth in claim 6 wherein the portion of the upper wall through which said third opening extends is tilted upwardly from the center toward the periphery of the wall.

10. A water purification device as set forth in claim 6 and further including a receptacle having substantially the same shape as said housing for receiving said housing therein and having an opening in the bottom thereof to which said conduit means is connected for communication with the entrance opening in said housing.

* * * * *